May 21, 1940.                P. C. KINGSBURY                2,201,684
                              CERAMIC ARTICLE
                            Filed Sept. 2, 1937
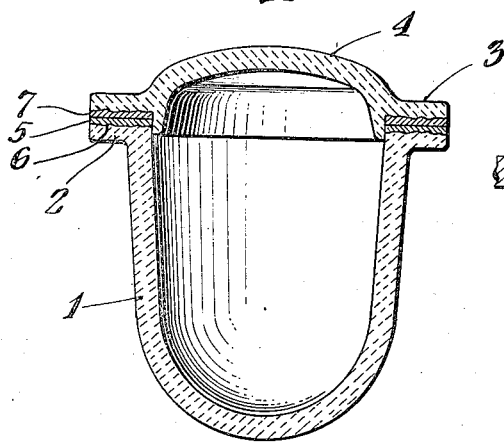
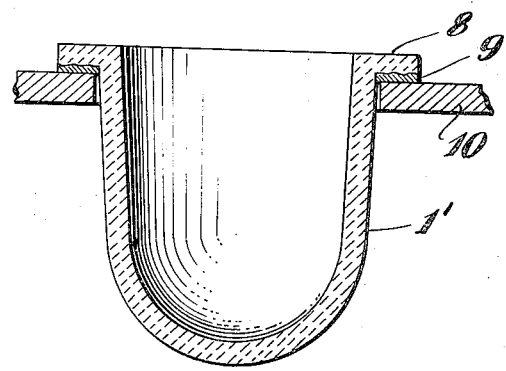
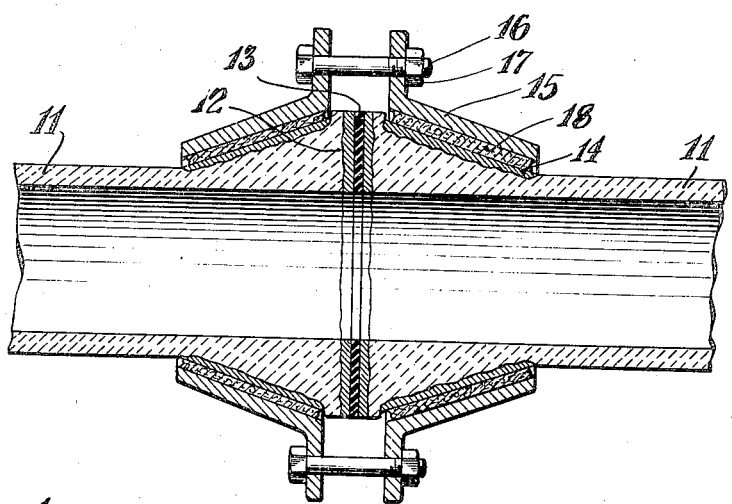
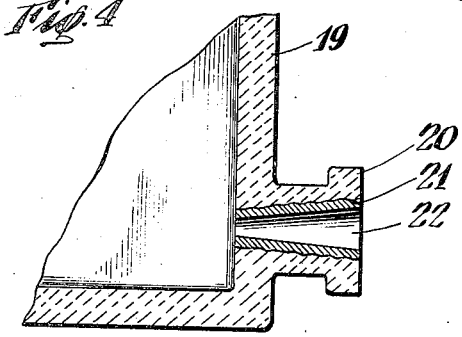
INVENTOR
Percy C. Kingsbury
BY
ATTORNEYS Patented May 21, 1940

2,201,684

UNITED STATES PATENT OFFICE 2,201,684

CERAMIC ARTICLE

Percy C. Kingsbury, Elizabeth, N. J., assignor to General Ceramics Company, a corporation of New Jersey Application September 2, 1937, Serial No. 162,119

6 Claims. (Cl. 263—48)

This invention relates to a ceramic article and more particularly is directed to a ceramic article made from a body containing silicon carbide.

Ceramic articles made from a body containing silicon carbide have many uses in industry where their peculiar refractory and heat conducting properties are desirable. Bodies of this type are readily shaped and can be formed into numerous devices. However, with all their advantages, silicon carbide bodies possess one characteristic which renders certain operations in their fabrication expensive and laborious, namely, their extreme hardness. Silicon carbide is one of the hardest materials known and is used commonly as an abrasive as well as a refractory. In the form of wheels, it is commonly utilized as a grinder for ceramic articles. Obviously, attempting to grind a silicon carbide body with a silicon carbide wheel is both expensive and difficult.

It is accordingly an object of this invention to overcome the above mentioned difficulties and to form a silicon carbide body with a surface which can readily be ground by ordinary grinding methods.

A more particular object of this invention is the formation of an improved silicon carbide body having a contacting or engaging surface which can easily be ground and polished to a smooth finish.

Still another object of this invention is the manufacture of a silicon carbide body having a contacting surface of a relatively soft material bonded thereto.

Other objects will become apparent from the following description taken in connection with the attached drawing showing several illustrative embodiments of the invention and wherein:

Fig. 1 is a cross-sectional view of one form of my improved silicon carbide body;

Fig. 2 is a cross-sectional view illustrating another form of my invention;

Fig. 3 is a cross-sectional view of still another application of my invention; and Fig. 4 shows a cross-sectional view of another embodiment illustrating my improved ceramic body.

As shown in Fig. 1, my invention is applicable to a ceramic body in the shape of an ordinary vessel or kettle. This vessel may be formed of a silicon carbide composition consisting of from 20 to 60% silicon carbide and 80 to 40% clay. These proportions are not critical and depend entirely upon the desired characteristics of the vessel. As ordinarily made, the vessel 1 is provided with a projecting flange 2 and is adapted to be covered by a lid 4 having a cooperating projecting flange 3. In many instances it is desirable to form a tight fit between the lid and the vessel. For this purpose there may be provided on the upper surface of the projecting flange 2 an annular layer or overlay 5 of stoneware. If desired, a similar layer 7 of stoneware can be provided on the lower surface of the projecting flange 3 of the lid 4. These cooperating stoneware layers are preferably ground by ordinary grinding methods and their smooth engaging surfaces will therefore provide the desired close fit between the main vessel body and its lid.

The integral vessel made up of a silicon carbide body of desired proportions is formed in the usual manner. A thin layer of stoneware is then placed around the top of the vessel. The combined structure is then fired, thereby producing a unitary body, the stoneware during the firing process becoming firmly bonded with the silicon carbide body. This bond will result in a slightly uneven line, as shown at 6. The fired product is then glazed or otherwise treated, as desired, and the stoneware surface is ground smooth. The same method applies to the making of the lid 4.

The specific composition of the stoneware rim 5 is relatively unimportant. It need not have the same refractory or heat conducting properties as those of the main vessel 1, as it is so thin that it cannot materially affect those properties in the main body. In practice, this layer of stoneware has a thickness of about $\frac{1}{8}$ inch but it is pointed out at this time that this thickness is not critical and may be varied within such limits that it will not all be removed during the grinding process nor will it be so thick as to affect the desired heat conducting and refractory properties of the vessel as a whole.

The layer of stoneware 5 should preferably have one distinguishing characteristic, namely, its co-efficient of expansion should be substantially that of the silicon carbide body 1. The reason for this is to prevent a break between the stoneware and silicon carbide body when the vessel is heated during use.

The overlay or layer may be made of any known or suitable material having the stated properties. As characteristic of such material I have found compositions including aluminum silicates as suitable. As an example of such a composition the following may be used:

Ball clay_____ 15 to 65 parts by weight, for example about 45 parts.
Kaolin_____ 5 to 25 parts by weight, for example about 17 parts.
Feldspar_____ 5 to 25 parts by weight, for example about 17 parts.
Cristobalite_____ 0 to 10 parts by weight, for example about 7 parts.
Sand flint_____ 0 to 10 parts by weight, for example about 6 parts.
Stoneware grog____ 0 to 25 parts by weight, for example about 10 parts.

The proportions given may be varied as required and some of the ingredients may be omitted entirely. Under some conditions one or more of the following ingredients may also be used:

Whiting_____ Up to about 5 parts
Talc_____ Up to about 5 parts
Fused silica_____ Up to about 5 parts Fig. 2 illustrates another manner in which this invention may be applied to a silicon carbide vessel. In many instances, it is desirable that such a vessel shown as 1 should be evenly supported on the lower edge of its flange or other projection or projections 8, as upon a ring 10 of metal or any suitable material. In order to procure an accurate fit between the projecting portion of the vessel and the ring 10, the lower surface of such projecting portion must be smooth. For this purpose, the stoneware overlay 9 is bonded to the silicon carbide body and ground. The resulting unitary vessel will accordingly rest correctly upon its supporting ring 10.

Still another application of my invention is illustrated in Fig. 3 which discloses pipes 11 of silicon carbide material joined together in the usual manner by rings 15 held together through bolts 16 and nut 17. Between the pipe flanges there is preferably inserted a gasket 13 of rubber or other suitable material. In order to insure a tight fit between the ends of the pipe and the intermediate gasket, a thin layer of stoneware 12 may be bonded to the respective pipe ends. By suitably grinding such stoneware surfaces to a smooth finish, a close fluid-tight joint can readily be obtained. If desired, the annular flanged surfaces of the pipe may also be provided with such a stoneware covering shown as 14. This will provide a smooth surface for the clamping ring 15 which preferably, but not necessarily, acts upon the silicon carbide pipe through packing material 18.

In Fig. 4 there is disclosed still another important manner in which my invention is applicable. It is often desirable to provide a vessel with an opening for a valve or cock. If such a vessel, illustrated at 19, is made of silicon carbide, it is almost impossible to make the opening to have a smooth engaging surface. However, by providing a stoneware ring 21 from the main body portion 19 to the extending member 20 and then griding this opening 22 by ordinary means, any desired device may be inserted therein, as a close fit is assured.

It is believed obvious from the above examples, that my invention is applicable to any ceramic article, especially having a silicon carbide body, in which a smooth contacting surface is desired. The ordinary method of making the article is used, with the additional step of providing the desired contacting surface with the layer of stoneware. The article is then fired in the usual manner, whereby the stoneware layer is bonded with the main body.

Although my invention has been specifically described in connection with silicon carbide bodies, in its broadest aspect it is clearly applicable to any ceramic body of highly abrasive material including, for example, the various well-known aluminous abrasives.

Accordingly, while I have shown and described several embodiments of my invention, it is to be understood that it may be embodied in other forms without departing from the principle thereof as expressed in the following claims.

I claim:

1. A silicon carbide body, a member engaging said body, and an intermediate relatively thin layer of stoneware bonded on one side to said body and having a smoothly ground contacting surface on its other side, whereby a close tight fit between said body and said member is obtained.

2. An article of manufacture comprising an annular silicon carbide body having a thin annular layer of stoneware bonded thereto, said stoneware having a smoothly ground contacting outer surface.

3. The combination according to claim 2 in which said stoneware has substantially the same co-efficent of expansion as said silicon carbide body.

4. A ceramic vessel having a silicon carbide body portion, an annular ring of stoneware bonded thereto, the outer surface of which is ground to present a smooth contacting surface, and a lid of ceramic material engaging said smooth stoneware surface for tightly closing said vessel.

5. The combination according to claim 4 in which said lid comprises a silicon carbide body having an annular ring of stoneware bonded thereto and adapted to engage the stoneware ring of said vessel.

6. An article of manufacture comprising a silicon carbide body having a thin layer of stoneware bonded thereto, said stoneware having a smoothly ground outer surface.

PERCY C. KINGSBURY.